United States Patent
Sato et al.

(10) Patent No.: US 6,389,892 B1
(45) Date of Patent: May 21, 2002

(54) LIQUID LEVEL DETECTION DEVICE AND METHOD OF MANUFACTURING CONDUCTOR ELECTRODE USED THEREFOR

(75) Inventors: Koichi Sato; Naoki Sato, both of Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/582,407

(22) PCT Filed: Oct. 18, 1999

(86) PCT No.: PCT/JP99/05740

§ 371 Date: Jun. 26, 2000

§ 102(e) Date: Jun. 26, 2000

(87) PCT Pub. No.: WO00/26620

PCT Pub. Date: May 11, 2000

(30) Foreign Application Priority Data

Oct. 30, 1998 (JP) .......................................... 10-311078

(51) Int. Cl.[7] .............................................. G01F 23/00
(52) U.S. Cl. ...................... 73/304 R; 73/290 R; 73/305; 73/313; 73/317
(58) Field of Search .......................... 73/290 R, 304 R, 73/305, 313, 317

(56) References Cited

U.S. PATENT DOCUMENTS

| 5,746,088 A | * | 5/1998 | Sawert et al. .................. 73/317 |
| 6,021,668 A | * | 2/2000 | Sawert et al. .................. 73/313 |
| 6,212,950 B1 | * | 4/2001 | Cooper et al. ................. 73/313 |

FOREIGN PATENT DOCUMENTS

| JP | 54-157663 | 12/1979 |
| JP | 58-82622 | 6/1983 |
| JP | 4-1682 | 1/1992 |
| JP | 6-16824 | 3/1994 |
| JP | 6-40821 | 5/1994 |

* cited by examiner

Primary Examiner—Hezron Williams
Assistant Examiner—Katina Wilson
(74) Attorney, Agent, or Firm—McDermott, Will & Emery

(57) ABSTRACT

A liquid level detection device having a contact portion or a conductor electrode withstanding degradation is provided. The liquid level detection device 1 includes a moving element including a float 9 and an arm 10 operating according to the level in a fuel tank 2, a contact portion 7 provided at a sliding body 8 operating in synchronization with the movement of the moving element, and an insulating substrate 6 provided with a conductor electrode 4 which the contact portion 7 slides on, and the contact portion 7 is formed of an alloy free from Ag (silver).

5 Claims, 3 Drawing Sheets

LIQUID LEVEL DETECTION DEVICE AND METHOD OF MANUFACTURING CONDUCTOR ELECTRODE USED THEREFOR

TECHNICAL FIELD

The present invention relates to a liquid level detection device for detecting the liquid level in a fuel tank in a vehicle for example, and a method of manufacturing a conductor electrode used therefor, and more particularly to an improvement to a contact portion provided at a sliding body or a conductor electrode provided at an insulating substrate.

BACKGROUND ART

There has been a well-known liquid level detection device including a moving element including a float moving up and down according to the liquid level in a fuel tank, a contact portion provided at a sliding body sliding in synchronization with the movement of the moving element, and an insulating substrate provided with a conductor electrode having a prescribed arrangement pattern depending upon the sliding track of the contact portion, the upward and downward movement of the liquid level is transmitted to the sliding body through the moving element, the contact portion of the sliding body slides on the conductor electrode into contact with the conductor electrode, and the resistance value changes depending upon the position of the conductor electrode in contact, so that the liquid level in the fuel tank is detected.

In such a liquid level detection device, for the material of the contact portion, a AgPd (silver-palladium) alloy, a AgCu (silver-copper) alloy, a AgNi (silver-nickel) alloy or the like is generally used. A conductor electrode 4 is for example made of a mixture of AgPd (silver-palladium) powder and glass as disclosed by Japanese Patent Publication No. 4-1682, and it has been known that the conductor electrode of such mixture is obtained by mixing Ag (silver) powder, palladium (Pd) powder and glass powder into paste, and printing the paste on an insulating substrate, followed by drying and sinter. Although Ag (silver) has small electrical resistance and good electrical conductivity, when used in fuel, it could deteriorate and corrode because of the sulfur component, water, alcohol or the like in the fuel, which leads to a conduction defect. Therefore, for the contact portion, an alloy is formed with the addition of an anti-degradation, anti-corrosion material such as Pd (palladium), Cu (copper), and Ni (nickel), while for the conductor electrode, a mixture is formed with the addition of an anti-degradation, anti-corrosion material of Pd (palladium) as countermeasure against degradation and corrosion.

Note however that such anti-degradation and anti-corrosion measure is not sufficient in the contact portion or conductor electrode, and if the fuel is of gasoline, the sulfur therein sulfurizes the Ag (silver) component, which sometimes causes a contact defect. Therefore, there has been a strong demand for a contact portion or conductor electrode which withstands the degradation by sulfurization or the like. Note that in this point Japanese Utility Model Publication No. 4-1682 or Japanese Utility Model Laying-Open No. 6-40821 discloses the arrangement of covering the top of the conductor electrode of a Ag (silver) alloy with a conductive protection film for degradation protection in order to prevent the alloy including Ag (silver) from degrading, but the additional protection layer inevitably and disadvantageously increases the cost and man-hours.

The present invention therefore provides a liquid level detection device having a contact portion or conductor electrode which withstands degradation or corrosion by sulfurization or the like, or a method of manufacturing a conductor electrode used therefor. The invention specifically provides a liquid level detection device having a contact portion or conductor electrode which withstands degradation or corrosion or a method of manufacturing a conductor electrode used therefor while restraining the increase in the cost or man-hours.

DISCLOSURE OF THE INVENTION

The liquid level detection device according to the present invention includes a moving element operating according to the liquid level in a fuel tank, a contact portion provided at a sliding body operating in synchronization with the movement of the moving element, and an insulating substrate provided with a conductor electrode which the contact portion slides on, the contact portion is formed of an alloy free from Ag (silver), and therefore the contact portion is less degraded by sulfurization or the like, so that the durability of the contact portion may be improved. Such an alloy without Ag (silver) includes any alloy having an anti-degradation characteristic in fuel, and for this kind of alloys, an alloy including CuNi (copper-nickel) as a main constituent, or an alloy including CuNiZn (copper-nickel-zinc) as a main constituent or an alloy including this is preferable because it is relatively inexpensive and yet has high degradation resistance. The use of an alloy including CuNiZn (copper-nickel-zinc) as a main constituent is particularly advantageous in many respects because the Zn (zinc) can prevent oxidation and has good resistance against alcohol and water included in the fuel.

Also in this case, if the conductor electrode side is covered with a conductive protection film having corrosion resistance, the anti-degradation characteristic not only on the contact portion side but also on the conductor electrode side can be improved, and such a conductive protection film includes any film as long as it can protect the conductor electrode, and may be formed for example by Ni (nickel) plating.

A method of manufacturing a conductor electrode for use in a liquid level detection device according to the present invention includes the step of printing paste formed by mixing powder including AgPd (silver-palladium) alloy powder and glass powder on an insulating substrate, and the step of sinter said paste printed on said insulating substrate, so that the resulting conductor electrode may have high degradation resistance, and an additional conductive protection film which has been required in the conventional technique is not necessary, which can restrain increase in the cost and man-hours.

The liquid level detection device according to the present invention includes a moving element operating according to the liquid level in a fuel tank, a contact portion provided at a sliding body operating in synchronization with the movement of the moving element, and an insulating substrate provided with a conductor electrode which the contact portion slides on, the conductor electrode made of a mixture of the AgPd (silver-palladium) alloy powder and glass is less susceptible to degradation such as sulfurization, the durability of the conductor electrode can be improved, an additional conductive protection film which has been necessary in the conventional technique is not necessary, and therefore the cost and man-hours can be prevented from increasing. As the AgPd (silver-palladium) alloy powder, only an AgPd (silver-palladium) alloy may be used, but a powder component of another material may be added or supplemented to powder including this alloy as a main constituent.

In this case, if the ratio of Pd (palladium) in the alloy including AgPd (silver-palladium) as a main constituent is set to approximately 40% by weight or higher, degradation resistance higher than that of an alloy including approximately 40% by weight or less of Pd (palladium) results.

Also in this case, if the contact portion side is made of an alloy including copper and nickel as main constituents or an alloy including copper, nickel and zinc as main constituents, the anti-degradation characteristic on the conductor electrode side may be improved as well, which improves the durability.

Furthermore, according to the present invention, since the hardness of the contact portion is lower than that of said conductor electrode, abrasion at the conductor electrode having a small thickness may be prevented, and high durability results. Also in this case, since the contact portion is formed in a contact member separately attached to the sliding body, the thickness of the contact portion does not depend on the thickness of the sliding body as compared to the conventional case where the conductor plate itself serving as a sliding body is partially deformed at a prescribed position to form a contact portion, so that the thickness of the contact portion may be increased, and a contact portion capable of withstanding abrasion caused on the conductor electrode for its low hardness can be provided.

In addition, according to the present invention, there are provided a moving element operating according to the liquid level in a fuel tank, a contact portion provided at a sliding body operating in synchronization with the movement of the moving element, and an insulating substrate provided with a conductor electrode which the contact portion slides on, the contact portion is made of an alloy of a first conductive material other than silver and a second conductive material other than Pd (palladium) having degradation or corrosion resistance in fuel, and therefore the anti-degradation and anti-corrosion characteristics may be improved inexpensively. As the first conductive material, Cu (copper) is preferable for its small electrical resistance, good electrical conductivity, and low price. As the second conductive material, Ni (nickel) is preferable for its high anti-degradation and anti-corrosion characteristics and low price. Since said contact portion includes Zn (zinc), the anti-oxidation characteristic can be improved, and resistance against alcohol and water in fuel may be provided.

BRIEF DESCRIPTION OF THE DRAWING

FIG. 1 is a front view of a main part of a liquid level detection device,

FIG. 2 is an enlarged front view showing a main part thereof,

FIG. 3 is a cross sectional view taken along line 3—3 in FIG. 2,

FIG. 4 is a front view showing the backside of the sliding body in FIG. 2, and

FIG. 5 is a block diagram showing an example of a liquid level indication system using a liquid level detection device according to the present invention as a liquid level detection sensor.

FIG. 6 is a cross sectional view of a main part of a conductor electrode, and

FIG. 7 is a block diagram of a process of manufacturing a conductor electrode.

BEST MODES FOR CARRYING OUT THE INVENTION

Figure 1:
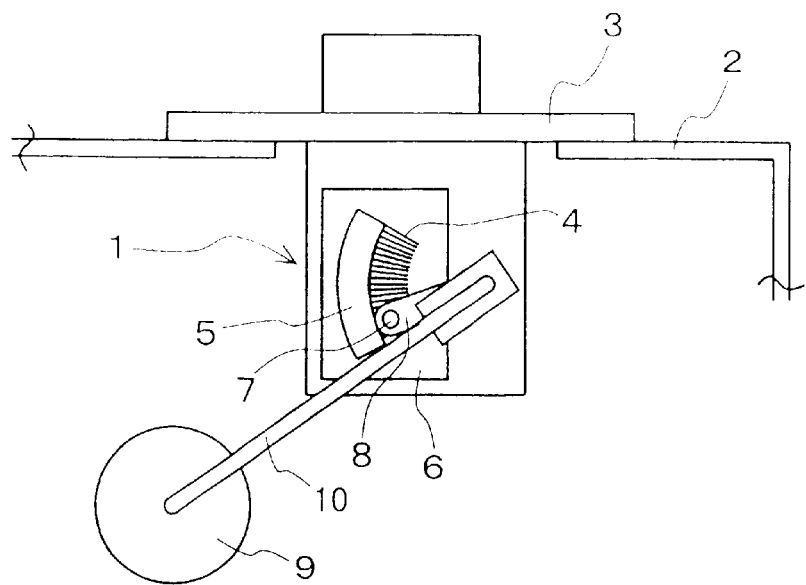
FIGS. 1 to 5 are views of a first embodiment of the present invention, where

In FIG. 1, a liquid level detection device 1 is stored in a fuel tank 2, and provided at an attaching plate 3 attached to the opening of the fuel tank 2.

Attached at the lower side of the attaching plate 3 is a detection portion including an insulating substrate 6 of ceramic formed by printing a conductor electrode 4 and resistor 5, and a sliding body 8 having a contact portion 7 which slides on the conductor electrode 4.

Figure 2:
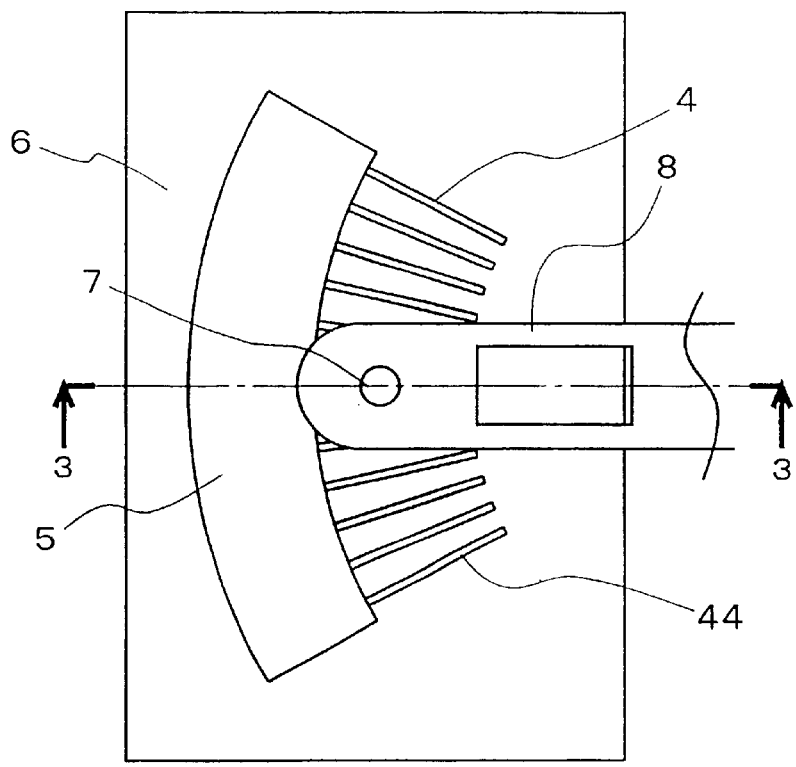

As shown in FIG. 2, the conductor electrode 4 includes a plurality of electrode patterns 44 arranged in a sector shape along the pivoting track of the contact portion 7 at appropriate intervals on the insulating substrate 6.

The resistor 5 is formed by sinter a printed layer including ruthenium oxide for example as a main constituent and is adhered to continuously cover a part of each of the plurality of electrode patterns 44 forming the conductor electrode 4 as shown in FIG. 2.

Figure 3:
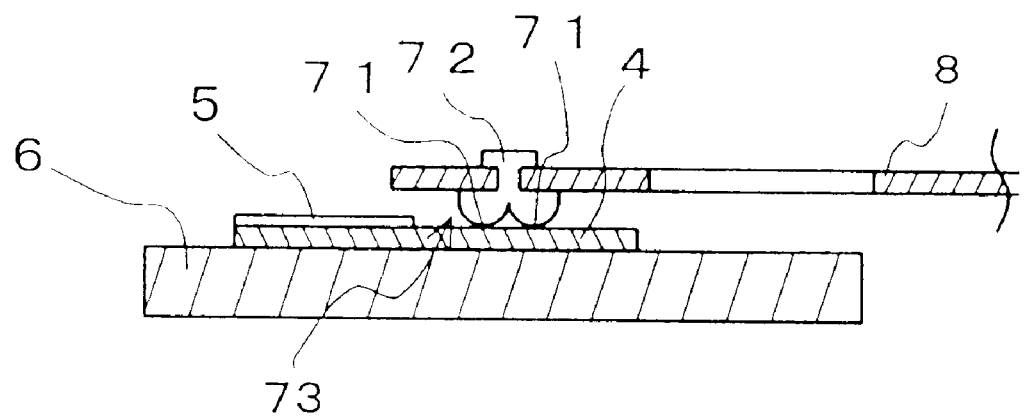
Figure 4:
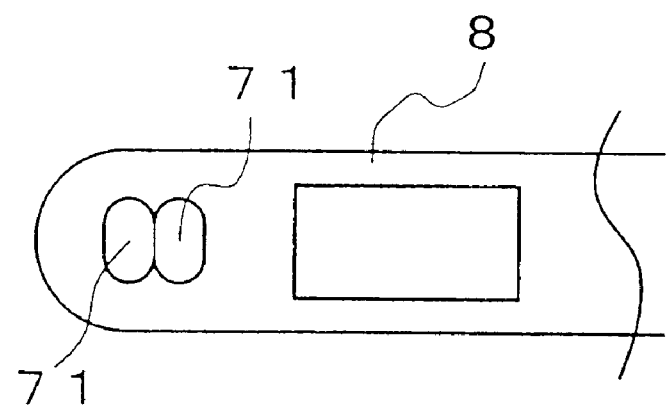

As shown in FIGS. 3 and 4, the contact portion 7 includes a sliding portion 71 serving as a sliding contact part to the conductor electrode 4, and a contact member 73 having a caulking portion 72 on the opposing side to the sliding portion 71, and is secured by caulking to the sliding body 8 through the caulking portion 72.

The sliding body 8 is made of a metal plate having a spring function such as a metal plate formed of phosphorus bronze, rigidly supported to respond to the moving element including a float 9 and an arm 10 moving up and down according to the level of the fuel, while it is rigidly supported by the insulating substrate 6 so that the contact portion 7 rigidly attached thereto is movable on the insulating substrate 6 according to said liquid level.

Therefore, the upward and downward movement of the liquid level is transmitted to the sliding body 8 through the float 9 and the arm 10, the contact portion 7 slides on and comes into contact with the conductor electrode 4 on the insulating substrate 6, and the resistance value attaining effective resistance between the position of the conductor electrode 4 (electrode patterns 44) in contact and one end side changes and the current value passed between the contact portion 7 and the conductor electrode 4 is determined. Change in the current value is output as a detection signal through an output terminal which is not shown, and an example of such a liquid level detection device 1 used as a sensor portion in a liquid level indication system is shown in FIG. 5.

Figure 5:
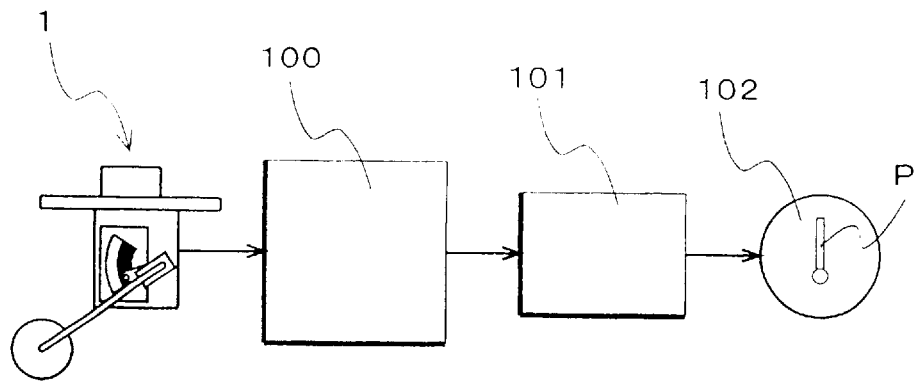

More specifically, in FIG. 5, there are a microcomputer 100, an actuating driver 101 to output a prescribed voltage in response to an instruction signal from the microcomputer 100, an indication portion 102 for example formed of a crossed coil type gauge which causes a pointer P to angularly move in response to a driving voltage output from the actuating driver 101. The detection signal of the liquid level detection device 1 is converted into a driving signal according to the liquid level through the microcomputer 100 and the actuating driver 101, the pointer P of the indication portion 102 is pivoted at a prescribed deflection angle based on the driving signal in order to indicate the liquid level in the fuel tank 2. In this case, the liquid level detection device 1 is provided in the fuel tank 2 as described above, and used for example as it is immersed in the fuel depending upon the amount of the fuel such as gasoline.

The liquid level indication system is a so-called microcomputer-controlled liquid level indication system in which a signal is converted into a driving voltage through the microcomputer 100 which determines the current value passed between the contact portion 7 and the conductor electrode 4, and the actuating driver 101 as described above, and the indication value of the pointer P at the indication portion 102 is determined based on the driving voltage. In this system, the current value passed between the contact portion 7 and the conductor electrode 4 is set smaller through a circuit component which is not shown such as resistor than a conventional, battery direct coupled type, so-called direct acting type system, and if the fuel includes gasoline, the system is particularly susceptible to the influence of the sulfuration of the contact portion 7 or the conductor electrode 4.

Therefore, in the present embodiment, based on the findings from experiments that the Ag (silver) component of the AgPd (silver-palladium) alloy, AgCu (silver-copper) alloy, AgNi (silver-nickel) alloy conventionally and typically used as the material of the contact portion 7 strongly contributes to a cause for degradation such as sulfuration, the material of the contact portion (contact member) is improved as follows.

More specifically, in this embodiment, the contact member 73 having the contact portion 7 is formed of an alloy itself including as a main constituent an alloy free from silver and having resistance against degradation e.g. sulfuration such as an alloy mainly composed of a CuNi (copper-nickel) or CuNiZn (copper-nickel-zinc), and the contact portion 7 formed of such a material is securely attached to the sliding body 8 by caulking with a separate part from the sliding body 8 as described above.

In this embodiment, the hardness of the contact portion 7 (contact member 73) is lower than that of the conductor electrode 4, and is set for example to Hv (Vickers hardness) 160 or lower (conditions: 100 g, 5 sec).

Thus, the liquid level detection device 1 according to the embodiment includes the moving element including the float 9 and the arm 10 operating according to the liquid level in the fuel tank 2, the contact portion 7 provided at the sliding body 8 operating in synchronization with the movement of the moving element, and the insulating substrate 6 provided with the conductor electrode 4 which the contact portion 7 slides on. The contact portion 7 is formed of an alloy free from Ag (sliver), and therefore the contact portion 7 is less susceptible to degradation caused by sulfuration for example, which can improve the durability of the contact portion 7.

As in this embodiment, when the liquid level detection device 1 is incorporated into the microcomputer-controlled, liquid level indication system, the device is more susceptible to the influence of the sulfuration or the like of the contact portion 7, because the current value passed between the contact portion 7 and the conductor electrode 4 is smaller than the value of the conventional, battery direct coupled, so-called direct acting type system, but since the contact portion 7 is formed of an alloy free from Ag (silver), the contact portion 7 is more restrained from degrading by sulfuration or the like, so that the device is particularly useful for the microcomputer-controlled liquid level indication system. Also in this case, if the upper limit value of the current value passed between the contact portion 7 and the conductor electrode 4 can be set to 40 mA or lower, said resistor connected between a battery which is not shown and the liquid level detection device 1 to lower the voltage supply (current) to the liquid level detection device 1 can be restrained from generating heat.

Such an alloy without Ag (silver) may include any alloy having an anti-degradation characteristic in fuel, and for this kind of alloys, an alloy including CuNi (copper-nickel) as a main constituent or an alloy including this, or an alloy including CuNiZn (copper-nickel-zinc) as a main constituent or an alloy including this is preferable because it is relatively inexpensive and yet has a high anti-degradation characteristic as compared to other materials.

Also, the use of an alloy including CuNiZn (copper-nickel-zinc) as a main constituent is particularly advantageous in many respects because the Zn (zinc) component can restrain oxidation and has good resistance against alcohol and water included in the fuel.

Note that in this embodiment, the material of the conductor electrode 4 is typical AgPd (silver-palladium) glass formed by mixing Ag (silver) powder, palladium (Pd) powder and glass powder into paste, printing the paste on the insulating substrate 4, and drying it, followed by sinter, but if there is a concern about-degradation on the side of the conductor electrode 4 including Ag (silver), a conductive protection film having corrosion resistance such as Ni (nickel) plating may be provided on the side of the conductor electrode 4.

Also in the embodiment, the hardness of the contact point 7 is set lower than that of the conductor electrode 4, so that abrasion at the thin conductor electrode 4 (as thin as 15 $\mu$m, for example) as compared to the thick contact portion 7 (as thick as 1 mm, for example) can be restrained, which can improve the durability.

In this case, the hardness of the contact portion 7 is set to Hv (Vickers hardness) 160 or lower (conditions: 100 g, 5 sec), so that stress applied upon the conductor electrode 4 may be reduced, the surface of the conductor electrode 4 may be restrained from being damaged and the conductor electrode 4 may be improved in the durability.

Also in this embodiment, since the contact portion 7 is formed at the contact member 73 separately attached to the sliding body 8, as compared to the conventional arrangement where the conductor plate itself serving as a sliding body is partly deformed at a prescribe position to form a contact portion or the arrangement where the sliding body 8 itself is formed by a conductive plate having the contact portion 7 and made of a CuNi (copper-nickel) alloy or a CuNiZn (copper-nickel-zinc) alloy, the thickness of the contact portion 7 does not depend upon the thickness of the sliding body (conductive plate) 8, so that the contact portion 7 may have an increased thickness, and the contact portion 7 capable of withstanding abrasion caused on the conductor electrode 4 for its low hardness may be formed, which can improve the durability.

In addition, according to the present invention, there are provided the moving element operating according to the liquid level in the fuel tank 2 and formed of the float 9 and the arm 10, the contact portion 7 provided at the sliding body 8 operating in synchronization with the movement of the moving element, and the insulating substrate 6 provided with the conductor electrode 4 which the contact portion 7 slides on, the contact portion 7 is made of an alloy of a first conductive material other than Ag (silver) and a second conductive material other than Pd (palladium) and having degradation or corrosion resistance in the fuel, and therefore the anti-degradation and anti-corrosion characteristics may be improved inexpensively.

As the first conductive material, Cu (copper) is preferable for its small electrical resistance, good electrical conductivity, and low price. As the second conductive material, Ni (nickel) is preferable for its high anti-degradation and anti-corrosion characteristics and low price. Since the contact portion 7 includes Zn (zinc), the anti-oxidation characteristic can be improved, and resistance against alcohol and water in fuel may be provided.

Figure 6:
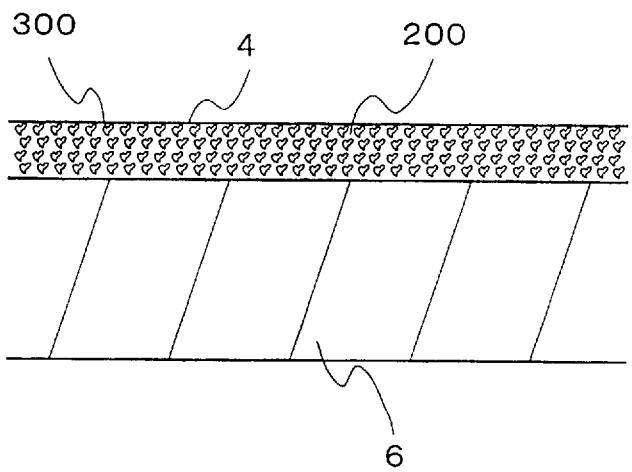
FIGS. 6 and 7 show a second embodiment of the present invention, where

FIG. 6 shows a second embodiment of the present invention, and based on the findings from experiments that the Ag (silver) component of the AgPd (silver-palladium) glass conventionally and typically used as the material of the conductor electrode 4 strongly contributes to a cause for degradation such as sulfuration, the material of the conductor electrode 4 is improved as follows.

More specifically, similarly to the first embodiment, according to this embodiment, there are provided a moving element including a float 9 and an arm 10 operating according to the level in a fuel tank 2, a contact portion 7 provided at a sliding body 8 operating in synchronization with the movement of the moving element, and an insulating substrate 6 provided with a conductor electrode 4 which the contact point 7 slides on, while as shown in FIG. 6, the conductor electrode 4 according to this embodiment is formed of a mixture of AgPd (silver-palladium) alloy particles (powder) 200 and glass 300.

Figure 7:
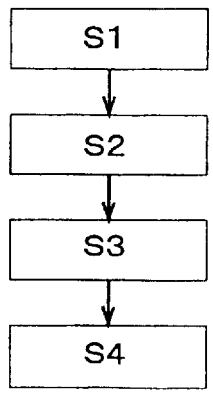

As shown in FIG. 7, the conductor electrode 4 of the mixture of the AgPd (silver-palladium) alloy particles 200 and glass 300 is formed by the mixing step S1 of mixing the AgPd (silver-palladium) alloy powder and the glass powder into paste, the printing step S2 of printing the paste on the insulating substrate 6, and the drying step S3 of drying the printed paste, and the sinter step S4 of sinter the paste printed on the insulating film 6 for example at a temperature of 850° C.

The AgPd (silver-palladium) alloy may be an alloy including only an AgPd (silver-palladium) alloy or an alloy mainly composed of this, and the powder is manufactured by previously producing a Ag (silver) and Pd (palladium) alloy, thereby grinding and processing the same to form the AgPd (silver-palladium) alloy powder. In the conventional technique, the material resulting from mixing Ag (silver) powder, Pd (palladium) powder and glass powder into paste, printing, the paste on an insulating substrate, followed by drying and sinter does not allow Ag (silver) and Pd (palladium) to form a complete alloy under the sinter conditions, and therefore abrasion powder if any against the contact portion 7 is likely to cause sulfuration of the Ag (silver). Meanwhile, according to the embodiment, the alloy powder is previously formed and ground, and therefore the binding between the Ag (silver) and the Pd (palladium) is strong, so that the resulting conductor electrode 4 has strong resistance against degradation caused by sulfuration or the like.

Also in this case, it has been confirmed that the ratio of the Pd (palladium) in the AgPd (silver-palladium) alloy is preferably set to approximately 40% by weight or higher, and then higher degradation resistance is provided than the case of alloys having approximately 40% by weight or less of Pd (palladium).

As in the foregoing, the liquid level detection device 1 according to the present embodiment includes the moving element operating according to the level in the fuel tank 2 and formed of the float 9 and the arm 10, the contact portion 7 provided at the sliding body 8 operating in synchronization with the movement of the moving element, and the insulating substrate 6 provided with the conductor electrode 4 which the contact portion 7 slides, on, the conductor electrode 4 is formed of the mixture of AgPd (silver-palladium) alloy particles (powder) 200 and glass 300, so that degradation by sulfuration or the like is less likely, and the durability of the contact portion can be improved. In addition, an additional conductive protection film which has been required in the conventional technique is not necessary, and therefore the cost and man-hours can be restrained from increasing. Note that as the AgPd (silver-palladium) alloy powder, only an AgPd (silver-palladium) alloy may be used, but a powder component of another material may be added or supplemented.

The conductor electrode 4 according to the present embodiment is formed by the mixing step S1 of mixing AgPd (silver-palladium) alloy powder and glass power into paste, the printing step S2 of printing the paste on the insulating substrate 6, the drying step S3 of drying the printed paste, and the sinter step S4 of sinter the paste printed on the insulating film 6, so that the resulting conductor electrode 4 has high degradation resistance. Furthermore, an additional conductive protection film which has been required in the conventional technique is not necessary, which can restrain increase in the cost and man-hours. Note that the steps S1 to S4 according to the embodiment are described simply by way of illustration, any process may be employed as long as AgPd (silver-palladium) alloy powder and glass powder are mixed into paste, and the paste is printed on the insulating substrate 6, followed by sinter to obtain the conductor electrode 4.

Also in this case, if the ratio of Pd (palladium) in the AgPd (silver-palladium) alloy is set to approximately 40% by weight or higher, degradation resistance higher than alloys including approximately 40% by weight or less of Pd (palladium) results.

A third embodiment, though not shown, includes a moving element including a float 9 and an arm 10 operating according to the level in a fuel tank 2, a contact portion 7 provided at a sliding body 8 operating in synchronization with the movement of the moving element, and an insulating substrate 6 provided with a conductor electrode 4 which the contact portion 7 slides on, and if the conductor electrode 4 is formed of a mixture of AgPd (silver-palladium) alloy particles (powder) 200 and glass 300, and the contact portion 7 is formed of a CuNi or CuNiZn alloy, the degradation resistance of both conductor electrode 4 and contact portion 7 may be improved and a liquid level detection device with high reliability as a product can be manufactured.

It is understood that in the foregoing second and third embodiments, the liquid level detection device 1 may be advantageously incorporated into the microcomputer-controlled liquid level indication system. Also in the above embodiments, the moving element including the float 9 and the arm 10 is used, but the present invention may be applied to a so-called vertical type liquid level detection device in which an insulating substrate 6 provided with a conductor electrode 4 is provided vertically to a tank 2, and a sliding body 8 having a contact portion 7 is provided at the inner wall of a float 9 surrounding the insulating substrate 6.

INDUSTRIAL APPLICABILITY

The present invention is applicable not only to a liquid level detection device for a vehicle such as an automobile, but also to a wide variety of liquid level detection devices for use as they are immersed in liquid such as fuel.

What is claimed is:
1. A liquid level detection device, comprising a moving element operating according to a liquid level in a fuel tank, a contact portion provided at a sliding body operating in synchronization with the movement of the moving element, and an insulating substrate provided with a conductor elec- trode which the contact portion slides on, said conductor electrode being composed of a mixture of silver-palladium alloy powder and glass.

2. The liquid level detection device according to claim 1, wherein said silver-palladium alloy includes approximately 40% by weight or more of palladium.

3. The liquid level detection device according to claim 1, wherein said contact portion is composed of an alloy including copper and nickel or an alloy including copper, nickel and zinc.

4. The liquid level detection device according to claim 1, wherein said contact portion is formed at a contact member secured at said sliding body.

5. The liquid level detection device according to claim 4, wherein said contact portion is formed at a contact member secured at said sliding body.

* * * * *